United States Patent [19]
Jarcho et al.

[11] 4,312,821
[45] Jan. 26, 1982

[54] CERAMIC FORMING PROCESS

[75] Inventors: Michael Jarcho, Schodack, N.Y.; Michael Rossetti, Woburn, Mass.

[73] Assignee: Sterling Drug Inc., New York, N.Y.

[21] Appl. No.: 34,413

[22] Filed: Apr. 30, 1979

[51] Int. Cl.$^3$ .............................................. C04B 33/28
[52] U.S. Cl. ....................................... 264/43; 106/35; 264/299; 264/333
[58] Field of Search .................. 264/86, 43, 299, 333; 106/35

[56] References Cited

U.S. PATENT DOCUMENTS

| | | | |
|---|---|---|---|
| 2,161,281 | 6/1939 | Carter | 264/86 |
| 3,431,332 | 3/1969 | Cummings | 264/86 |
| 3,526,685 | 9/1970 | Foster | |
| 4,097,935 | 7/1978 | Jarcho | 106/35 |
| 4,195,366 | 4/1980 | Jarcho et al. | 106/35 |

OTHER PUBLICATIONS

Norton, *Fine Ceramics, Technology and Applications,* 1970, pp. 101-129.
Kingery, *Introduction to Ceramics,* 1960, pp. 33-77.
Norton, *Elements of Ceramics,* 1974, pp. 92-153.

*Primary Examiner*—John Parrish
*Attorney, Agent, or Firm*—Paul E. Dupont; B. Woodrow Wyatt

[57] ABSTRACT

A novel process is disclosed for producing a fracture-free shaped ceramic green body which comprises casting an aqueous suspension of hydroxylapatite, whitlockite or a mixture of these having a high water content and high drying shrinkage in an impervious mold, the cavity surfaces of which are coated with an inert water-immiscible lubricant; drying the casting under controlled conditions of temperature and humidity and removing adsorbed lubricant from the resulting dried green body.

18 Claims, No Drawings

CERAMIC FORMING PROCESS

BACKGROUND OF THE INVENTION

1. Field of the Invention

The subject matter of this invention resides in the field of ceramics, particularly in the area of forming methods for producing shaped ceramic articles.

2. Description of the Prior Art

The fabrication of shaped ceramic articles generally requires as a first step the formation of a green body, i.e. the molding of the mineral raw materials into a shape corresponding substantially to that of the ultimately desired ceramic article. The green body is then dried and fired to a hard, permanent shape. Many techniques known in the art can be employed to produce ceramic green bodies. A number of these, for example, powder pressing, extrusion, plastic forming and slip casting are described by Kingery (*Introduction to Ceramics,* John Wiley & Sons, Inc., New York, 1960, pp. 33–77) and Norton (*Elements of Ceramics,* Second Edition, Addison-Wesley Publishing Company, Reading, Mass., 1974, pp. 92–153).

Slip casting, a well-known and widely-used technique, is also described by Norton (*Fine Ceramics, Technology and Applications,* McGraw-Hill, Inc., New York, 1970, pp. 101–129). This method involves pouring a suspension or slip into a porous plaster mold. As the mold adsorbs water from the suspension a hard layer of clay is built up. The process is continued until the interior of the mold is filled. The molded clay body is then dried and fired.

It is well recognized in the ceramics art that among the most important properties required in a casting slip are low drying shrinkage and good flow properties, that is, the slip must have as low a water content as possible so as to minimize shrinkage on drying and yet must contain sufficient water to flow readily. These conflicting requirements are usually met by employing deflocculating agents which permit the formation of a fluid suspension with a relatively small amount of water. Thus, conventional casting slips ordinarily contain no more than about 15–25 percent water and on drying undergo a volume shrinkage of about 5–10 percent and no more than about 15–20 percent.

Other molding techniques have also been described. Thus, the E. G. Foster, et al. U.S. Pat. No. 3,526,685 filed Sept. 22, 1967, issued Sept. 1, 1970 discloses a process for producing foamed gypsum castings which comprises casting a foaming slurry of calcium sulfate in a mold having its internal faces lined with non-porous polyolefin-coated material.

Much current ceramic research has focused on producing a high-strength calcium phosphate ceramic, for example hydroxylapatite or whitlockite, in a form suitable for use as a surgical prosthetic device. This effort has primarily centered around powder pressing methods and has produced porous materials generally lacking the strength required in many implant devices.

Recently, Jarcho (U.S. Pat. No. 4,097,935, filed Jan. 31, 1977, issued July 4, 1978) has described a process for producing a novel, high-strength, non-porous ceramic form of hydroxylapatite which involves the precipitation of hydroxylapatite from aqueous solution in a gelatinous state, drying the gelatinous material and then sintering to produce the novel ceramic. However, the gelatinous precipitate which contains large amounts of occluded water undergoes substantial shrinkage upon drying resulting in separation, cracking or fracture, and conventional molding techniques have not been completely satisfactory when it is desired to produce large, defect-free, shaped bodies. Thus, there is need for a simple, economical and reproducible forming process for producing defect-free, shaped green bodies of hydroxylapatite and whitlockite which can be used to overcome this problem.

SUMMARY OF THE INVENTION

Despite the relatively high water content and the resultant high drying shrinkage of the gelatinous calcium phosphate precipitates, we have now discovered a method for slip casting these meterials to form defect-free, shaped, ceramic green bodies therefrom.

It is therefore a primary object of this invention to provide a method of casting an aqueous suspension of a calcium phosphate having a water content of about 75–95 percent by weight and a volume drying shrinkage of about 80–95 percent to produce a fracture-free, calcium phosphate ceramic green body which can ultimately be fired to produce a polycrystalline, sintered ceramic article.

It is a further object of the present invention to provide an improvement in the processes for producing shaped, polycrystalline, sintered calcium phosphate ceramic bodies.

Accordingly, as more particularly described hereinbelow, the present invention provides a novel process for forming a defect-free, shaped, ceramic green body comprising a calcium phosphate selected from hydroxylapatite, whitlockite or a mixture of these which comprises casting an aqueous slurry of the appropriate calcium phosphate in an impervious mold, the cavity surfaces of which are coated with an inert, water-immiscible lubricant, drying the casting under conditions of temperature and humidity effective in producing a fracture-free green body and removing adsorbed lubricant from the resulting dried green body.

DETAILED DESCRIPTION OF THE INVENTION INCLUSIVE OF THE PREFERRED EMBODIMENTS

The invention sought to be patented resides in a process for forming a shaped, ceramic green body comprising a calcium phosphate selected from hydroxylapatite, whitlockite or a mixture of hydroxylapatite and whitlockite which comprises the steps of: casting an aqueous slurry of said calcium phosphate in an impervious mold, the cavity surfaces of which are coated with an inert, water-immiscible lubricant having a viscosity such that a liquid film of lubricant is formed between the mold surface and the slurry at the drying temperature of the slurry; drying the resulting molded slurry at a temperature and relative humidity such that the rate of evaporation of water from the surface of the slurry is approximately equal to the rate of diffusion of water from the interior of the slurry to the surface thereof; and removing adsorbed lubricant from the resulting dried green body.

In one of its preferred aspects the invention resides in a process for forming a fracture-free, shaped, ceramic green body comprising hydroxylapatite or a mixture of hydroxylapatite and whitlockite which can be sintered to produce a shaped article in the form of a substantially fully dense, polycrystalline ceramic as described in Jarcho U.S. Pat. No. 4,097,935.

In another of its preferred aspects the present invention resides in a process for forming a fracture-free, shaped, ceramic green body comprising whitlockite which can be sintered to produce a shaped article in the form of a substantially fully dense, polycrystalline, whitlockite ceramic.

The mineral raw material for the present process, that is, a calcium phosphate either as hydroxylapatite, whitlockite or a mixture of these, is prepared as a gelatinous precipitate from aqueous solution in accordance with the procedures described hereinafter. The precipitate is isolated from the reaction medium, usually by centrifugation followed by decantation of the supernatant, and the water content of the residual gelatinous calcium phosphate is adjusted to afford a pourable slurry or casting slip. Such a slurry will ordinarily contain from about 5–25 percent by weight, preferably about 10–15 percent by weight, of solids, the remainder, i.e. 85–90 percent, of course, being water. The pH of the slurry is not critical provided it is higher than about pH 7, below which the calcium phosphates are unstable. Oridinarily, a pH of about 9–10 is preferred.

If desired, the slurry can be de-aired in order to remove entrained gases and thus prevent the formation of voids in the dried green body. Although this is ordinarily not necessary for the casting of simple shapes where any entrained air is expelled during the drying process, it may be advantageous in the casting of very large or complex forms where air bubbles may remain trapped in the interior of the mold. Furthermore, in the casting of complex shapes it may also be advantageous to vibrate or centrifuge the filled mold in order to drive air bubbles to the surface and to insure that the slurry completely fills the mold cavity.

In contrast to conventional slip-casting methods in which the slip is cast in a porous mold in order that water might be absorbed from the slurry by the mold material, the present process requires that the calcium phosphate slurry be cast in a mold constructed of relatively impervious material such as polymethyl methacrylate, graphite, stainless steel, polytetrafluoroethylene and polyethylene, the last being preferred. However, any rigid material which is impervious and non-reactive with the calcium phosphate slurry can, of course, be used.

Moreover, the cavity surfaces of the mold are coated with a water-immiscible lubricant having a viscosity such that it forms a liquid layer between the mold and the slurry at the drying temperature of the slurry. Since, as noted hereinabove, the slurry undergoes a volume shrinkage of about 80–95 percent on drying, the liquid layer of lubricant is important in reducing the frictional forces between the mold surface and the slurry, particularly when the latter has dried to a gel-like consistency. At this point, the cohesive strength of the casting is minimal, hence requiring an essentially zero coefficient of friction between the mold and the casting in order to avoid fracture of the latter. It will be apparent that the lubricant must also be non-reactive toward the calcium phosphate. Suitable lubricants are the various paraffin jellies and oils, i.e. semi-solid and liquid hydrocarbons having a density in the approximate range 0.820–0.905. Paraffin oil (density 0.875–0.905) is particularly preferred since it can be applied in aerosol form, thus insuring uniform coating of the cavity surfaces of the mold expecially where these are intricately shaped.

Again due to its high drying shrinkage, the molded slurry must be dried under controlled conditions of temperature and humidity in order to produce an intact, defect-free green body. Thus, temperature and humidity are selected so that the rate of evaporation of water from the surface of the slurry is approximately equal to the rate of diffusion of water from the interior of the slurry to its surface, thereby avoiding the creation of density gradients which lead to stress development and cracking. Drying can be effected at approximately 30°–60° C. at ambient relative humidity or at about 70°–90° C. at high relative humidity. The latter conditions are conveniently achieved by heating the molded slurry at about 70°–90° C. in the presence of a reservoir of water. Specific drying conditions are generally selected on the basis of the shape of the casting. Thus, a casting having a large exposed surface area, for example a thin, flat shape is dried at low temperature and ambient relative humidity, whereas a casting having a small exposed surface area, for example a cylindrical rod or cone, is dried at high temperature and humidity. Drying time at a given temperature will depend upon the size or bulk of the casting.

The dried green body will, of course, retain a certain amount of adsorbed lubricant which can be removed by extraction or volatilization. Extraction is effected by thoroughly washing the green body with a suitable solvent, such as heptane or hexane. Volatilization of the lubricant is conveniently accomplished by heating the green body. It is imperative that the heating be carried out slowly since rapid volatilization of the lubricant will cause the green body to rupture. Temperature, rate and time of heating will, of course, be dictated by the volatility and amount of adsorbed lubricant and to some extent, also by the volume of the green body since a large body could be subject to thermal shock and fracture upon rapid heating. Ordinarily, heating the green body from about 150° C. to 350° C. at a rate of approximately 25° C. per hour will completely remove all adsorbed lubricant. Of course, if the body is small and contains very little adsorbed lubricant, more rapid heating is possible, for example, from room temperature to 400° C. in about one hour.

The resulting dried green body, though opaque and porous, possesses considerable strength and can be easily handled. Thus, it can be further shaped, ground, machined or drilled prior to sintering. The green bodies comprising hydroxylapatite or a mixture of hydroxylapatite and whitlockite are sintered in accordance with the procedures described in Jarcho U.S. Pat. No. 4,097,935. Sintering of the green bodies comprising whitlockite can be effected by heating at about 1000° C. to 1350° C. for approximately 0.5 to 4 hours, preferably at about 1150° C. to 1200° C. for approximately 1 hour. Sintering causes a further volume shrinkage of about 10–20 percent thus resulting in an overall volume shrinkage from molded slurry to sintered ceramic of approximately 90–97 percent.

The mineral raw materials themselves, i.e. hydroxylapatite, whitlockite or a mixture of these as well as the processes for the preparation thereof do not constitute any part of the present invention. These materials are either known or can be prepared according to the procedures described hereinbelow.

Thus, the preparation of hydroxylapatite or a mixture of hydroxylapatite and whitlockite as a gelatinous precipitate is described in detail in Jarcho U.S. Pat. No. 4,097,935, the subject matter of which is incorporated herein by reference. As stated therein, the composition of the ultimately produced ceramic, that is, whether hydroxylapatite or a mixture of hydroxylapatite and whitlockite depends on the molar ratio of calcium to phosphorus in the gelatinous precipitate. Moreover, it is imperative that the hydroxylapatite or the mixed hydroxylapatite/whitlockite be prepared as a gelatinous precipitate from aqueous solution, for it is only in this cohesive gelatinous state that the product can be shaped or molded and then dried and sintered to produce a ceramic body. Accordingly, calcium ion is reacted with phosphate ion in the appropriate ratio in aqueous medium to give a gelatinous precipitate of a calcium phosphate. The gelatinous precipitate is separated from the reaction medium and the water content of said precipitate is adjusted to give a pourable slurry which is then cast in accordance with process of the present invention as above-described.

Similarly, it is also necessary to prepare whitlockite as a gelatinous precipitate from aqueous solution in order to ultimately obtain a shaped ceramic body. In this instance, however, simply reacting calcium ion with phosphate ion in the appropriate whitlockite stoichiometry, i.e. Ca/P=1.5 is ineffective in producing pure whitlockite and instead affords a mixture of whitlockite and hydroxylapatite. This problem has been overcome by the addition of a small amount of sulfate ion to the calcium phosphate precipitate which results in complete conversion of the latter to substantially pure whitlockite (containing within its crystal lattice about 0.1 to 2.2 percent by weight sulfate ion) containing no detectable trace of hydroxylapatite. Thus, calcium ion is reacted with phosphate ion in a molar ratio of about 1.2–1.5:1 in aqueous medium at a pH of about 10–12 to produce a gelatinous precipitate of a calcium phosphate having a molar ratio of calcium to phosphorus in the approximate range 1.50–1.53:1, separating said gelatinous precipitate from the solution, washing said precipitate free of soluble salts with water, homogeneously suspending the washed precipitate in approximately 1–3 percent aqueous ammonium sulfate in the amount of about 10–20 ml. per gram of expected whitlockite and separating the precipitate from the ammonium sulfate solution. The water content of the precipitate is then adjusted to give an appropriate casting slip.

Thus, whitlockite is precipitated from aqueous medium by reacting calcium ion with phosphate ion at a pH of about 10–12. Any calcium—or phosphate—containing compounds which provide calcium and phosphate ions in aqueous medium are suitable provided that the respective counter ions of said compounds are easily separated from the whitlockite product, are not themselves incorporated in the whitlockite lattice, or do not otherwise interfere with the precipitation or isolation of the whitlockite. Compounds which provide calcium ion are, for example calcium nitrate, calcium hydroxide, calcium acetate and the like. In the present method, calcium nitrate and diammonium hydrogen phosphate are the preferred sources of calcium and phosphate ions, respectively.

First, calcium nitrate and diammonium hydrogen phosphate in a molar ratio of about 1.2–1.5:1 are interacted in aqueous solution at a pH of about 10–12 to produce a gelatinous precipitate of calcium phosphate. Temperature is not critical and the precipitation can be carried out from about 0° C. to 100° C., but is preferably carried out at about room temperature. The gelatinous precipitate thus obtained is separated from the solution by suitable means, for example by centrifugation and decantation of the supernatant. The residual mineral sludge can be washed free of any remaining soluble salts by suspending in distilled water, centrifuging and decanting the supernatant. The residual product is then homogeneously suspended in 1–3 percent (w/w) aqueous ammonium sulfate. Ordinarily, 10–20 ml. of 1–3 percent (w/w) aqueous ammonium sulfate per gram of theoretically expected whitlockite ceramic is employed. The solid is then separated from the solution by centrifugation or vacuum filtration and the resulting wet precipitate is diluted with water to give a pourable slurry which is then cast in accordance with the process of the present invention as described hereinabove.

It is important that the calcium to phosphorus ratio of the isolated precipitate correspond as closely as possible to the theoretical value for whitlockite, i.e. Ca/P=1.50, in order to minimize the hydroxylapatite content of said precipitate and thereby minimize the amount of ammonium sulfate required to produce substantially pure whitlockite. Thus, if the calcium to phosphorus ratio of the precipitate is substantially greater than about 1.53, exposure to 1–3 percent aqueous ammonium sulfate is inadequate to produce pure whitlockite and affords instead a mixture of whitlockite and hydroxylapatite. A calcium phosphate precipitate having a calcium to phosphorus ratio greater than 1.53 can be converted completely to whitlockite by employing a larger amount of ammonium sulfate. In fact, a precipitate of pure hydroxylapatite (Ca/P=1.67) can be converted to whitlockite by usig sufficiently large quantities of ammonium sulfate. However, the whitlockite produced thereby is contaminated with significant amounts of calcium sulfate. Accordingly, in order to ensure that the calcium to phosphorus ratio does not exceed about 1.53, the calcium and phosphate salts are mixed in a molar ratio of 1.5:1 or less, preferably 1.2–1.4:1. The calcium phosphate precipitate so-produced has a calcium to phosphorus ratio of about 1.50–1.53, and following treatment with 1–3 percent aqueous ammonium sulfate (about 10–20 ml. per gram of theoretically expected whitlockite) ultimately affords substantially pure whitlockite.

The instant forming process can also be employed to cast a foamed calcium phosphate slurry to produce a shaped, ceramic green body as a stable dried foam which, upon sintering, produces a shaped, foamed ceramic article. This is conveniently accomplished by incorporating in the calcium phosphate slurry about 0.5–10 percent by weight of a blowing agent, for example azodicarbonamide, hydrogen peroxide or ammonium carbonate, and about 0.5–10 percent by weight of a foam stabilizer such as albumen, polyvinyl alcohol or polyethylene glycol. Upon heating, the blowing agent releases gaseous decomposition products which are trapped by the foam stabilizer thereby creating a stable foam.

Thus, to the gelatinous calcium phosphate precipitate are added about 10–100 mg., preferably about 15–20 mg., of spray-dried egg white per gram of theoretically expected ceramic and at least an equal amount, i.e. about 10–200 mg., preferably about 15–30 mg. of azodicarbonamide. The water content of the mixture is then adjusted to give a pourable slurry which is cast in a suitable mold in accordance with the above-described process and heated at about 70°–90° C. under conditions of high relative humidity for approximately 8 to 20 hours, or until decomposition of the blowing agent and drying of the resulting foam are substantially complete. The resulting shaped, dried foam is heated at about 1000°–1350° C. until volatilization of the foam stabilizer and sintering of the resulting product are substantially complete.

Alternatively, the blowing agent can be omitted and the foam created mechanically by whipping air into the mixture. It is also possible to incorporate in the casting slurry volatile, pore-forming agents such as starch, collagen, cellulose and organic compounds such as naphthalene.

Thus, to the gelatinous calcium phosphate precipitate are added about 0.5–10 percent by weight of a foam stabilizer such as egg albumen and 0.5–10 percent by weight of a volatile pore-forming agent such as cellulose. The water content of the mixture is then adjusted to give a pourable slurry which is whipped to a foam by vigorous stirring. The foam is poured into a suitable mold and dried in accordance with the process of the present invention. Heating the resultant shaped, dried foam at about 1000°–1350° C. until volatilization of the foam stabilizer and pore-forming agent and the sintering of the resulting product are substantially complete produces a polycrystalline foamed ceramic body.

The invention is further illustrated by the following examples, without however, being limited thereto.

EXAMPLE 1

Hydroxylapatite in the form of a gelatinous precipitate of a phosphate of calcium having a molar ratio of calcium to phosphorus of about 1.67 prepared according to the procedures described in Jarcho U.S. Pat. No. 4,097,935, was treated with sufficient water to give a pourable slurry (specific gravity=1.12). The slurry was poured into a polyethylene mold (38×38×38 mm.) the cavity surfaces of which were coated with paraffin jelly (sold by Chesebrough-Ponds, Inc. under the trademark Vaseline). The molded slurry was dried at 50° C. overnight at ambient humidity. The resulting dried body (a block 22×22×12 mm.) was cut in half for visual examination to confirm homogeneity. Both halves were heated to 350° C. over a period of about 2 hrs. to remove adsorbed petrolatum. Sintering at 1100° C. for 1 hour afforded blocks (18×9×9 mm.) of hydroxylapatite ceramic.

EXAMPLE 2

A wet gelatinous precipitate of a phosphate of calcium prepared according to the procedure described in Jarcho U.S. Pat. No. 4,097,935 and having a molar ratio of calcium to phosphorus of about 1.53 and containing approximately 8 percent hydroxylapatite and about 92 percent whitlockite was diluted with sufficient water to give a pourable slurry. The slurry was de-aired and poured into a polyethylene mold (38×38×38 mm.) the cavity surfaces of which were coated with paraffin jelly. The molded slurry was dried at 80° C. overnight in a circulating air dryer containing a reservoir of water so as to maintain a relative humidity slightly less than 100 percent. The dried body (16×16×4 mm.) was then heated slowly over approximately 2 hours to 1100° C. and maintained at that temperature for about 1 hour to give a shaped ceramic piece 12×12×3 mm.

EXAMPLE 3

A solution containing 264.12 g. of diammonium hydrogen phosphate in 4.5 liters of water was adjusted to pH 11–11.5 with approximately 2.2 liters of concentrated ammonium hydroxide. Additional distilled water was added to dissolve precipitated ammonium phosphate giving a total volume of 9.6 liters. The pH of the solution was readjusted to 11–11.5 with 800 ml. of concentrated ammonium hydroxide. This solution was added dropwise over about 0.75 hour to a vigorously stirred solution containing 3 moles of calcium nitrate in 5.4 liters of distilled water previously adjusted to pH 11–11.5 with 90 ml. of concentrated ammonium hydroxide. When the addition was complete, the resulting gelatinous suspension was stirred at room temperature for 24 hours. A 200-ml. aliquot was centrifuged and the supernatant decanted. The residual sludge was diluted with 100 ml of 1 percent aqueous ammonium sulfate and stirred vigorously to give a homogeneous suspension. After centrifugation and decantation of the supernatant, the residue was diluted with 10 ml. of distilled water and the resultant slurry poured into a rectangular polyethylene mold, the cavity surfaces of which were coated with paraffin jelly. The molded slurry was dried at 90° C. overnight in a circulating air dryer containing a reservoir of water so as to maintain a relative humidity slightly less than 100 percent. The resulting partially dried slurry was further dried at 85° C. at ambient relative humidity for an additional 20 hours, after which it was sintered 1 hour at 1000° C. to afford a shaped body of fully dense whitlockite ceramic.

EXAMPLE 4

To a wet gelatinous precipitate containing 24 g. of a phosphate of calcium prepared according to the procedure described in Jarcho U.S. Pat. No. 4,097,935 and having a molar ratio of calcium to phosphorus of about 1.54 there was added 1.2 g. of powdered cellulose and 2 g. of spray-dried egg white previously reconstituted in 88 ml. of distilled water. The water content of the mixture was adjusted to give a pourable slurry and then whipped into a foam by stirring at high speed for about 1 hour. The foamed slurry was then poured into a rectangular polyethylene mold, the cavity surfaces of which were coated with paraffin jelly, and dried at 70° C. and high relative humidity. The resultant dried foam was then heated slowly over approximately 2 hours to 1100° C. and maintained at that temperature for about 1 hour to give a rectangular block of foamed ceramic comprising 12 percent hydroxylapatite and 88 percent whitlockite.

I claim:

1. In the process for producing a dense, polycrystalline sintered ceramic article comprising hydroxylapatite or a mixture of hydroxylapatite and whitlockite which comprises the steps of reacting calcium ion with phosphate ion in aqueous medium at a pH of about 10–12 to produce a gelatinous precipitate of a phosphate of calcium having a molar ratio of calcium to phosphorus in the approximate range of 1.50 to 1.67 separating said gelatinous precipitate from the reaction medium, heating said gelatinous precipitate up to a temperature of at least 1000° C. but below that at which appreciable decomposition of hydroxylapatite occurs and maintaining said temperature for sufficient time to effect the sintering and substantially maximum densification of the resulting product, the improvement wherein:

the water content of the gelatinous precipitate is adjusted to produce a homogeneous, pourable slurry having 5–25% solid content;

said slurry is cast in totally impervious mold the cavity surfaces of which are coated with an inert, water-immiscible lubricant having a viscosity such that a liquid film of lubricant is formed between the mold surface and the slurry at the drying temperature of the slurry;

the resulting molded slurry is dried at a temperature and relative humidity such that the rate of evaporation of water from the surface of the slurry is approximately equal to the rate of diffusion of water from the interior of the slurry to the surface thereof; and adsorbed lubricant is removed from the resulting dried green body prior to sintering.

2. A process according to claim 1 wherein the impervious mold is composed of a hydrophobic material selected from the group consisting of polyethylene, polytetrafluoroethylene, stainless steel and graphite.

3. A process according to claim 1 wherein the molded slurry is dried at about 30°–60° C. at ambient relative humidity.

4. A process according to claim 2 wherein the molded slurry is dried at about 70°–90° C. in the presence of a reservoir of water.

5. A process according to claim 1 wherein the inert, water-immiscible lubricant is selected from the group consisting of paraffin jelly having a specific gravity in the approximate range 0.820 to 0.865 and paraffin oil having a specific gravity in the approximate range 0.875 to 0.905.

6. A process according to claim 1 wherein adsorbed lubricant is removed from the dried green body by washing said body with a hydrocarbon solvent.

7. A process according to claim 1 wherein adsorbed lubricant is removed from the dried green body by heating said body at a temperature and for a time sufficient to effect volatilization of the lubricant without fracturing the green body.

8. A process according to claim 7 wherein the dried green body is heated from about 150° C. up to about 350° C. at a rate of approximately 25° C. per hour.

9. A process according to claim 1 for forming a shaped ceramic green body comprising hydroxylapatite wherein the phosphate of calcium has a molar ratio of calcium to phosphorus of about 1.67.

10. A process according to claim 1 for forming a shaped ceramic green body comprising a mixture of hydroxylapatite and whitlockite wherein the phosphate of calcium has a molar ratio of calcium to phosphorus less than about 1.67 but not less than about 1.50.

11. In the process for producing a dense, polycrystalline sintered whitlockite ceramic article which comprises the steps of reacting calcium ion with phosphate ion in a molar ratio in the approximate range 1.2–1.5:1 in aqueous medium at a pH of about 10–12 to produce a gelatinous precipitate of a calcium phosphate having a molar ratio of calcium to phosphorus in the approximate range 1.50–1.53:1; separating said gelatinous precipitate from the reaction medium; washing said precipitate free of soluble salts with water; homogeneously suspending the washed precipitate in 1–3 percent (w/w) aqueous ammonium sulfate in the amount of about 10–20 ml. per gram of theoretically expected whitlockite ceramic; separating the precipitate from the ammonium sulfate solution; drying said precipitate; and heating the dried precipitate in the approximate range 1000° C. to 1350° C. for about 0.5 to 4 hours, the improvement wherein:

following separation of the precipitate from the ammonium sulfate solution the water content of said precipitate is adjusted to produce a homogeneous pourable slurry having 5–25% solid;

said slurry is cast in a totally impervious mold the cavity surfaces of which are coated with an inert, water-immiscible lubricant having a viscosity such that a liquid film of lubricant is formed between the mold surface and the slurry at the drying temperature of the slurry;

the resulting molded slurry is dried at a temperature and relative humidity such that the rate of evaporation of water from the surface of the slurry is approximately equal to the rate of diffusion of water from the interior of the slurry to the surface thereof; and adsorbed lubricant is removed from the resulting dried green body prior to sintering.

12. A process according to claim 1 or 11 wherein the slurry has a solids content of approximately 10–15 percent by weight, the lubricant is paraffin oil having a specific gravity in the approximate range 0.875 to 0.905, the molded slurry is dried at about 50° C. at ambient relative humidity and the dried green body is heated from 160° C. to 320° C. at a rate of approximately 25° C. per hour.

13. A process according to claim 1 or 11 wherein the aqueous slurry further comprises about 0.5 to 10 percent by weight of a blowing agent and about 0.5 to 10 percent by weight of a foam stabilizer, said percentages being based on the weight of the calcium phosphate in the slurry; and wherein the molded slurry is dried at about 70°–90° C. at a relative humidity greater than about 95 percent but less than 100 percent until decomposition of the blowing agent and drying of the resultant foam are substantially complete.

14. A process according to claim 13 wherein the dried green body is heated at about 1000° C. to 1350° C. until volatilization of the foam stabilizer and sintering of the resulting product are substantially complete to produce a polycrystalline foamed ceramic body.

15. A process according to claim 1 wherein the aqueous slurry further comprises about 0.5 to 10 percent by weight of a foam stabilizer and about 0.5 to 10 percent by weight of a pore-forming agent, said percentages being based on the weight of calcium phosphate in the slurry; and wherein air is introduced into the aqueous slurry by vigorous stirring prior to casting.

16. A process according to claim 15 wherein the dried green body is heated at about 1000° C. to 1350° C. until volatilization of the foam stabilizer and pore-forming agent and the sintering of the resulting product are substantially complete to produce a polycrystalline foamed ceramic body.

17. A process according to claim 16 wherein the foam stabilizer is egg albumen and the pore-forming agent is powdered cellulose.

18. A process according to claim 1 wherein the molded slurry is centrifuged prior to drying.

* * * * *

UNITED STATES PATENT AND TRADEMARK OFFICE
CERTIFICATE OF CORRECTION

PATENT NO. : 4,312,821
DATED : January 26, 1982
INVENTOR(S) : Michael Jarcho and Michael Rossetti It is certified that error appears in the above-identified patent and that said Letters Patent is hereby corrected as shown below:

Column 9, line 11, claim 2, "claim 1" should read -- claim 1 or 11 --.

Column 9, line 15, claim 3, "claim 1" should read -- claim 1 or 11 --.

Column 9, line 18, claim 4, "claim 2" should read -- claim 1 or 11 --.

Column 9, line 21, claim 5, "claim 1" should read -- claim 1 or 11 --.

Column 9, line 27, claim 6, "claim 1" should read -- claim 1 or 11 --.

UNITED STATES PATENT AND TRADEMARK OFFICE
CERTIFICATE OF CORRECTION

PATENT NO. : 4,312,821
DATED : January 26, 1982
INVENTOR(S) : Michael Jarcho and Michael Rossetti It is certified that error appears in the above-identified patent and that said Letters Patent is hereby corrected as shown below:

Column 9, line 30, claim 7, "claim 1" should read -- claim 1 or 11 --.

Column 10, line 44, claim 15, "claim 1" should read -- claim 1 or 11 --.

Column 10, line 60, claim 18, "claim 1" should read --claim 1 or 11 --.

Signed and Sealed this

Tenth Day of December 1985

[SEAL]

Attest:

*Attesting Officer*

DONALD J. QUIGG

*Commissioner of Patents and Trademarks*